2,979,856

ATTRACTANTS FOR FRUIT FLIES

James D. Ponting, El Cerrito, Calif., assignor to the United States of America as represented by the Secretary of Agriculture No Drawing. Filed Sept. 25, 1959, Ser. No. 842,539

3 Claims. (Cl. 43—132)

(Granted under Title 35, U.S. Code (1952), sec. 266)

A non-exclusive, irrevocable, royalty-free license in the invention herein described, throughout the world for all purposes of the United States Government with the power to grant sublicenses for such purposes, is hereby granted to the Government of the United States of America.

This invention relates to the control of fruit flies of the genus Drosophila, especially *Drosophila melanogaster*. The objects of the invention include the provision of novel attractants for these insects and methods of preparing and utilizing the same.

Although it is known that fermenting carbohydrate material is attractive to Drosophila, it has not been previously known that the time of fermentation is critical to attain maximum attractive activity. In accordance with the present invention fruit material is inoculated with yeast and fermented for a period of time until a material is produced which displays maximum attractive effect. This time period is about 24 hours; depending on the type of fruit used and other variables, it may be as low as 18 hours and as high as 30 hours. The criticability of the fermentation time is shown by the following illustrative examples:

*Example I*

Juice made from dried figs was diluted with water to 10% soluble solids and inoculated with 1% of its weight of a mixture of bakers' yeast and wild yeasts obtained from fermenting dried prunes. The mixture was allowed to ferment at room temperature and at intervals portions were placed in traps and tested for attractiveness for *Drosophila melanogaster*. The results obtained are tabulated below—

| Time of fermentation, hours | No. of flies caught per hr. per 100 flies subjected to test |
|---|---|
| 0 | 0 |
| 6 | 13 |
| 24 | 33 |
| 30 | 16 |
| 48 | 4 |
| 54 | 0 |

*Example II*

Fresh bananas were mashed with water to provide a puree of 10% soluble solids. To this puree was added 1% of its weight of bakers' yeast. The mixture was allowed to ferment and at intervals samples were placed in traps and tested for attractiveness to *D. melanogaster*. It was found that the product exhibited maximum attractiveness after 30 hours fermentation as shown in the following table.

| Time of fermentation, hours | No. of flies caught per hr. per 100 flies subjected to test |
|---|---|
| 6 | 4 |
| 30 | 44 |
| 48 | 25 |
| 54 | 6 |

*Example III*

Various fruit materials diluted with water to 10% soluble solids were inoculated with 1% of bakers' yeast and allowed to ferment. Attractiveness tests were made as described above to determine optimum fermentation time. The results are tabulated below:

| Fruit material | Time of fermentation to reach maximum attractiveness, hrs. | No. of flies caught per hr. per 100 flies at optimum ferment time |
|---|---|---|
| Fig puree | 24 | 52 |
| Pear puree | 18–24 | 44 |
| Grape juice | 30 | 35 |

In making the attractiveness tests noted above, 100 to 200 flies which had been previously counted and maintained in a bottle with food material were released into a box of about 4 cu. ft. capacity. The traps were contained in this box. Each trap was made from a fruit jar having in its mouth a conical screen provided with 2 mm. hole at the apex of the cone. About 30 grams of attractant to be tested was placed in each trap. Trapping was continued for an hour, then the traps were removed from the box and the flies in the traps counted after anesthetizing with ether.

As evident from the preceding examples, the preparation of the attractants is extremely simple as it merely involves fermenting fruit material for a certain time. The fruit material may be of any type as apples, pears, apricots, peaches, figs, dates, bananas, plums, prunes, berries, etc. Generally the fruit is mashed to a liquid consistency and water is added, if necessary, to reduce its soluble solids content to about 5 to 15%. The fruit material is then inoculated with a small proportion, about 0.1 to 1% yeast. Usually ordinary bakers' yeast is used but wild yeasts naturally present on fruits may be used although the latter are generally not as convenient. After inoculation with the yeast the fruit material is allowed to stand at ordinary temperatures to ferment. When the fermenting mass reaches its peak of attractiveness it is used immediately. In using the fermented material it is placed in conventional traps which are placed in the locations where it is desired to control fruit flies. The traps may be provided with the conventional toxic agents to kill the flies which enter the traps or in the alternative the flies may be destroyed after trapping them live.

A particular advantage of the invention lies in the fact that for continued control of fruit flies a new batch of fruit material may be initiated every day and supplied to traps 18 to 24 hours later. In this way the traps will always be supplied with material fermented to provide the peak of attractiveness for the insects.

Having thus described the invention, what is claimed is:

1. In the method of controlling fruit flies of the genus Drosophila, the improvement which comprises using as an attractant fermented fruit material prepared by mashing fruit to a liquid consistency, adding water, where necessary, to reduce the solids content of the mash to about 5 to 15%, inoculating the mash with about 0.1 to 1% of bakers' yeast and fermenting the inoculated mash at ordinary temperatures for a period of about 24 hours.

2. In the method of controlling fruit flies of the genus Drosophila with traps containing an attractant, the improvement which comprises suppling to the traps as the attractant, fermented fruit material prepared by mashing fruit material to a liquid consistency, adding water, where necessary, to reduce the solids content of the mash to about 5 to 15%, inoculating the mash with about 0.1 to 1% of bakers' yeast and fermenting the inoculated mash at ordinary temperatures for a period of about 24 hours.

3. A method for controlling fruit flies of the genus Drosophila which comprises mashing fruit to a liquid consistency, adding water, where necessary, to reduce the solids content of the mash to about 5 to 15%, inoculating the mash with about 0.1 to 1% of bakers' yeast and fermenting the inoculated mash at ordinary temperatures for about 24 hours until it develops maximum attractiveness for such insects, immediately placing the said fermented mash into traps and placing the traps in the location where control of said fruit flies is desired.

References Cited in the file of this patent

UNITED STATES PATENTS 2,715,295    Brown            Aug. 16, 1955

OTHER REFERENCES

"Chemical Insect Repellants and Attractants," by V. G. Detheier. Published 1947 by the Blakiston Co. Philadelphia. Page 120.